(12) United States Patent
Li et al.

(10) Patent No.: US 11,912,802 B2
(45) Date of Patent: *Feb. 27, 2024

(54) SUPRAMOLECULAR STAR-SHAPED POLYMER WITH BETA-CD AS CORE AND PREPARATION METHOD

(71) Applicant: Southwest Petroleum University, Chengdu (CN)

(72) Inventors: Yongming Li, Chengdu (CN); Qiang Ren, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,512

(22) Filed: Dec. 16, 2022

(65) Prior Publication Data

US 2023/0203227 A1    Jun. 29, 2023

(30) Foreign Application Priority Data

Dec. 21, 2021   (CN) .......................... 202111586125.3

(51) Int. Cl.
| | |
|---|---|
| *C09K 8/68* | (2006.01) |
| *C08F 2/48* | (2006.01) |
| *C08F 251/00* | (2006.01) |
| *C09K 8/588* | (2006.01) |
| *C09K 8/88* | (2006.01) |

(52) U.S. Cl.
CPC ............. *C08F 251/00* (2013.01); *C08F 2/48* (2013.01); *C09K 8/588* (2013.01); *C09K 8/68* (2013.01); *C09K 8/885* (2013.01)

(58) Field of Classification Search
CPC .......... C08F 251/00; C08F 2/48; C09K 8/588; C09K 8/68; C09K 8/885
See application file for complete search history.

(56) References Cited

U.S. PATENT DOCUMENTS

2020/0332043 A1* 10/2020 Ren .......................... C08K 5/07

FOREIGN PATENT DOCUMENTS

| CN | 107033293 A | 8/2017 | |
|---|---|---|---|
| CN | 107459604 A | 12/2017 | |
| CN | 109053959 A | * 12/2018 | ......... C08B 37/0012 |
| WO | WO-2016/133466 A1 | 8/2016 | |

OTHER PUBLICATIONS

Luo, Shan et al., "Synthesis and solution behavior of imidazoline-based hydrophobically associating polymer," Chemical Research and Application, vol. 27, No. 8, Aug. 2015, pp. 1151-1156, with English abstract.

Zhong, Chuan-rong et al., "Studies of Heat Properties and Characterization of Hydrophobically Associating Water-Soluble Terpolymer of AM/STD/NaAMPS," Polymer Materials Science and Engineering, vol. 19, No. 6, Nov. 2003, pp. 126-130, with English abstract (see p. 130).

Geng, Tong-mou, Viscosity Behaviors of Aqueous Solution of Hydrophobically Associating Polymers P(AM/NaAA/DiAC16), Fine Chemicals, vol. 24, No. 9, Sep. 2007, pp. 914-918, with English abstract.

Huang, Xue-hong et al., "Studies on The Solution Properties of Water-Soluble Hydrophobically Associating Acrylamide-Hexadeyl Acrylate Copolymers," Journal of Functional Polymers, vol. 14, No. 12, Mar. 2001, pp. 90-94, with English abstract (see p. 94).

* cited by examiner

*Primary Examiner* — Kumar R Bhushan
(74) *Attorney, Agent, or Firm* — Muncy, Geissler, Olds & Lowe, P.C.

(57) ABSTRACT

A supramolecular star-shaped polymer with β-CD as a core and a preparation method thereof. The supramolecular star-shaped polymer with β-CD as a core has a β-cyclodextrin-modified branched monomer F-β-CD that serves as a core and is grafted with acrylamide, acrylic acid, hydrophobic monomers and surface-active macromolecular monomers to form a supramolecular star-shaped polymer. The hydrophobic monomer is one or more of N-benzyl-N alkyl (meth) acrylamide and N-phenethyl-N alkyl (meth) acrylamide; the surface-active macromolecular monomer is one or more of allyl polyoxyethylene ether, alkylphenol polyoxyethylene ether (meth)acrylate, allyl alkylphenol polyoxyethylene ether, alkyl alcohol polyoxyethylene ether (meth)acrylate and allyl alkyl alcohol polyoxyethylene ether. The method has cheapness and easiness to obtain raw materials, ease to control synthesis conditions, and high yield. The present invention has excellent tackifying performance, temperature resistance, salt resistance and hydrolysis resistance, so that it shows good application prospects in the aspect of enhancing recovery ratios and hydraulic fracturing in oilfields.

4 Claims, 3 Drawing Sheets

SUPRAMOLECULAR STAR-SHAPED POLYMER WITH BETA-CD AS CORE AND PREPARATION METHOD

FIELD OF THE INVENTION

The present invention relates to a supramolecular star-shaped polymer with β-CD as a core and a preparation method thereof for enhancing recovery ratios and hydraulic fracturing in oilfields.

BACKGROUND OF THE INVENTION

A hydrophobic associative polymer (HAP) refers to a water-soluble polymer that introduces a small amount of hydrophobic groups (typically, <2 mol %) onto a hydrophilic polymer macromolecular chain, so it is also called a hydrophobically associating water-soluble polymer. Due to the interaction between hydrophobic groups, the HAP behaves in solution with unique properties that differ from conventional polymers. In an aqueous solution, hydrophobic groups are concentrated with each other under hydrophobic interaction, so that a polymer macromolecular chain produces intramolecular and intermolecular association; when its polymer concentration is higher than a critical association concentration (CAC), the polymer macromolecular chains are concentrated under the function of hydrophobic association to form a dynamic physical cross-linked three-dimensional network structure where intermolecular association predominates; for its hydrodynamic volume increases, thus the solution has high-efficient tackifying performance, excellent salt resistance, and good temperature and shear resistance, so that it shows a good application prospect in the aspect of enhancing recovery ratios and hydraulic fracturing in oilfields.

The structure and type of hydrophobic monomers will greatly affect the properties of hydrophobic associative polymers. At present, the types of the hydrophobic monomers that have been reported include (meth) acrylate, styrene, (meth) acrylamide and allyl. For the acrylate-typed hydrophobic monomer (Huang Xuehong, et al. Study on the properties of hydrophobically associating water-soluble polymer (acrylamide-hexadecyl acrylate) solution. *Journal of Functional Polymers*, 2002, 14(1): 90-94) is extremely sensitive to temperature and pH, easily causing the polymer to lose its association effect and reduce the viscosity of polymer solution. For the styrene-typed hydrophobic monomer (Zhong Chuanrong, et al. Characterization and heat resistance of AM-STD-NaAMPS ternary hydrophobic associative polymer. *Polymer Materials Science and Engineering*, 2003, 19(6): 126-130), although it has a rigid benzene ring, which can effectively improve the temperature resistance and hydrolysis resistance of the polymer, but the benzene ring is too close to the main molecular chain, so that does not conduce to the copolymerization between hydrophobic monomers and acrylamide, nor does it conduce to improvement of the tackifying performance of polymer solution. For the allyl-typed hydrophobic monomer (Luo Shan, et al. Synthesis and solution properties of a hydrophobic associative polymer with imidazoline structure. *Chemical Research and Application*, 2015, 27(8): 1151-1156), it is not easy to achieve copolymerization with the main monomer acrylamide due to an allyl content, and the prepared hydrophobic associative polymer does not have a high molecular weight, nor obvious tackifying performance. The acrylamide-typed hydrophobic monomer (Geng Tongmou, Viscosity behavior of aqueous solution of hydrophobically associating water-soluble polymer P (AM/NaAA/DiAC16). *Fine Chemicals*, 2007, 24(9): 914-918) has the structure similar to acrylamide, which conduces to polymerization reaction, but there are still certain disadvantages of poor hydrolysis resistance.

At present, the hydrophobic associative polymer (HAP) is mainly of a linear chain structure, and has the disadvantages mainly in that under the function of high-speed shear, the molecular chain structure is unstable, so it is easy to fracture or get entangled, and its viscosity drops sharply. Therefore, how to further improve the shear resistance of hydrophobic associative polymers to meet the reservoir conditions that increasingly become harsh is a very challenging study content, and it is also an urgent problem to be solved in the process of oilfield development. A hyperbranched polymer has a hyperbranched three-dimensional structure, a large number of end groups, high solubility, and high chemical reactivity, so it can significantly improve the shear resistance of polymers. β-cyclodextrin, as a natural renewable raw material, is derived from wide sources, and free of pollution, and has good temperature resistance and shear resistance, and due to its characteristic of hydrophile exteriors and hydrophobic interiors, it can envelop and complexate hydrophobic groups to achieve copolymerization with aqueous solution of hydrophobic monomers. Therefore, the β-cyclodextrin-modified hyperbranched hydrophobic associative polymer not only has temperature resistance and salt resistance to some degree, but also has good shear resistance, showing a special structure and advantages.

SUMMARY OF THE INVENTION

An objective of the present invention is to provide a supramolecular star-shaped polymer with β-CD as a core, which has the advantage of both an associative polymer and a hyperbranched polymer, and has excellent tackifying performance, temperature resistance, salt resistance and hydrolysis resistance, so that it shows a good application prospect in the aspect of enhancing recovery ratios and hydraulic fracturing in oilfields.

Another objective of the present invention is to provide a method for preparing the forementioned supramolecular star-shaped polymer with β-CD as a core, which has reliability in principle, convenience to operate, cheapness and easiness to obtain raw materials, ease to control synthesis conditions, and high yield, so it conduces to environmental protection, and has a broad industrialization prospect.

In order to achieve the above technical objectives, the present invention adopts the following technical solutions.

A supramolecular star-shaped polymer with β-CD as a core has a β-cyclodextrin-modified branched monomer F-β-CD that serves as a core and is grafted with acrylamide, acrylic acid, hydrophobic monomers and surface-active macromolecular monomers to form a supramolecular star-shaped polymer.

The β-cyclodextrin-modified branched monomer F-β-CD has the following structure.

In the supramolecular star-shaped polymer with β-CD as a core, its branch chain has the following structural formula, where, x, y, m and n are a percentage of a structural unit, x is 70-85%, y is 10-25%, m is 0.05~0.2%, n=1-x-y-m; A is a hydrophobic monomer, which is one or more of N-benzyl-N alkyl (meth) acrylamide and N-phenethyl-N alkyl (meth) acrylamide; B is a surface-active macromolecular monomer, which is one or more of allyl polyoxyethylene ether, Alkyl phenol polyoxyethylene ether (methyl) acrylate, alkyl phenol polyoxyethylene ether allyl ether, alkyl alcohol polyoxyethylene ether (meth)acrylate and alkyl alcohol polyoxyethylene ether allyl ether; the supramolecular star-shaped polymer with β-CD as a core has a viscosity-average molecular weight of 1 to 8 million.

A method for preparing the forementioned supramolecular star-shaped polymer with β-CD as a core includes the following steps in sequence:

S1: preparing a β-cyclodextrin-modified branched monomer F-β-CD, provided in its procedures as follows:

S11: making β-cyclodextrin react with p-toluenesulfonyl chloride by means of anhydrous pyridine as a solvent to prepare all-6-position sulfonylated β-cyclodextrin Ts-β-CD;

S12: next making the all-6-position sulfonated β-cyclodextrin react with ethylenediamine by means of methanol as a solvent to prepare all-6-position ethylenediamine-substituted β-cyclodextrin EDA-β-CD having high reactivity; and S13: finally making the all-6-position ethylenediamine substituted β-cyclodextrin react with maleic anhydride by means of dimethyl sulfoxide as a solvent to give the target product, β-cyclodextrin-modified branched monomer F-β-CD; and S2: preparing a supramolecular star-shaped polymer with β-CD as a core, provided in its procedures as follows:

S21: adding acrylamide, acrylic acid and surface active macromolecular monomers to distilled water, adjusting the resultant solution's pH to about 7 with 10% NaOH solution; then adding hydrophobic monomers and a surfactant, sodium dodecyl sulfate, stirring the resultant solution until it becomes clear and transparent; next adding the β-cyclodextrin modified branched monomer F-β-CD, aerating the resultant solution with nitrogen for more than 15 min to remove dissolved oxygen from it to give to give a de-oxygenated system; and S22: adding a photoinitiator to the de-oxygenated system to give a solution, then placing the solution to react under a photoinitiation device for 3~5 h at a reaction temperature of 10~30° C., so as to obtain a white colloid, that is, a supramolecular star-shaped polymer with β-CD as a core.

The photoinitiator is azodiisobutyramidine hydrochloride (v50).

In S21, the total mass fraction of monomers in the reaction system is 20~25%, of which 15~20% is the acrylamide's mass fraction, 2~5% is the acrylic acid's mass fraction, 0.1~0.3% is the hydrophobic monomer's mass fraction, 0.2~0.6% is the surface active macromolecular monomer's mass fraction, 0.4~0.8% is the sodium dodecyl sulfate's mass fraction, and the mass of the β-cyclodextrin modified branched monomer F-β-CD is 0.3~0.5% of the total mass of monomers.

The synthesis process for preparing the β-cyclodextrin modified branched monomer F-β-CD in the present invention is as follows.

-continued

EF-β-CD

For the present invention adopts three functional monomers, it has the following advantages: introducing a branched structure enables the supramolecular star-shaped polymer to have an overall performance of temperature resistance, salt resistance, shear resistance and easy solubility; adopting a double-tailed structure for the hydrophobic monomer enables both the hydrophobic association to strengthen and the risk of hydrophobic monomers hydrolysis to decrease; and introducing a non-ionic surfactant monomer enables hydrophobic association to improve. Therefore, the supramolecular star-shaped polymer has excellent tackifying performance, salt resistance and temperature resistance; so that it can be used in oil and gas field development as an oil repellent or hydraulic fracturing thickener to enhance the recovery ratios of crude oil and has a broad application prospect.

DETAILED DESCRIPTION OF SOME EMBODIMENTS

We shall further describe the present invention according to the following drawings and examples, so that a person skilled in the art can understand the present invention. However, it should be understood that the present invention is not limited to the scope of specific embodiments, and for a person skilled in the art, any variation within the essence and scope of the present invention defined and determined by the attached claims falls within the protection of the present invention.

Example 1

A method for preparing the forementioned supramolecular star-shaped polymer with β-CD as a core includes the following steps.
S1: Preparing a β-cyclodextrin-modified branched monomer F-β-CD. Its procedures are detailed as follows.
S11: Freshly-dried β-CD (14.0 g, 12.3 mmol) is put into a three-necked flask, then 100 mL of dried pyridine is poured into it at room temperature under a magnetic stir to dissolve the solid well. After complete dissolution, a pyridine solution of p-toluenesulfonyl chloride (16.9 g, 88.6 mmol) is dropped under ice water bath conditions. After dropwise addition, the reaction system rises to room temperature and reacts for 24 hours. The solvent, pyridine, is recycled by rotary evaporation to give a rude product, then the crude product is put into a large amount of cold water and suction filtrated to give a white precipitate, which is washed with either 100 mL of water and ether, respectively, to give another crude product; this crude product is stirred in methanol for 30 min at 62-65° C. and suction filtrated to give a wet solid; the wet solid is dried under vacuum at 40° C. to give a white solid, all-6-position p-toluenesulfonyl β-cyclodextrin ester, denoted as Ts-β-CD, its yield is about 85%.
S12: Ts-β-CD (27.15 g, 12.3 mmol) reacts with excess ethylenediamine (5.92 mL, 88.6 mmol) in methanol (50 mL) serving as a solvent t at 40° C. for 48 hours. At the end of the reaction, a yellow liquid occurs, then the methanol and the excess ethylenediamine are removed by rotary evaporation to give a crude product, the crude product is dissolved in an appropriate amount of water, then this solution is dropped into a large amount of cold acetone solution for precipitation, next the resultant precipitate is suction filtrated and washed with ethanol, finally dried under vacuum at 40° C. to give a white solid, all-6-position ethylenediamine substituted β-cyclodextrin, denoted as EDA-β-CD, its yield is about 91.5%.

S13: EDA-β-CD (5.0 g) is dissolved in dimethyl sulfoxide (25 mL) to give a resultant solution, which is poured into a three-necked flask; anhydrous dimethyl sulfoxide solution (20 mL) where 2.5 g of maleic anhydride is dissolved is slowly dropped into the solution in the condition of an ice-salt bath aerated with nitrogen. After dropwise addition, the reaction continues for 24 hours at room temperature. The reaction solution is repeatedly precipitated in a large amount of cold acetone, then washed and suction filtrated to give a slightly yellowish solid, β-cyclodextrin modified functional monomer, denoted as F-β-CD, its yield is about 78%.

S2: Preparing a supramolecular star-shaped polymer with β-CD as a core. Its procedures are detailed as follows.

S21: 9.6 g of acrylamide, 2.5 g of acrylic acid and 0.3 g of surface active macromonomers, lauryl alcohol polyoxyethylene ether methacrylate, are put into distilled water, of this solution, the pH is adjusted to about 7 with 10% NaOH solution, then 0.1 g of hydrophobic monomers, N-benzyl-ndodecyl methyl acrylamide, and 0.25 g of surfactants, sodium dodecyl sulfate, are put into the solution, the resultant solution are stirred until it is clear and transparent, next β-cyclodextrin modified branched monomer F-β-CD (the total mass fraction of monomers is 0.4%0) is put into the resultant solution, and a certain amount of distilled water is poured to enable the total concentration of monomers to be 25%, finally the solution is aerated with nitrogen for more than 15 min to remove the dissolved oxygen in the solution to give a de-oxygenated system.

S22: A photoinitiator, v50 (the total mass fraction of monomer is 0.2%) is put to the de-oxygenated system to give a solution, which is placed under a photoinitiation device to react for 4 h at 1030° C. to give a white colloid, that is, a supramolecular star-shaped polymer with β-CD as a core.

Example 2

A method for preparing the forementioned supramolecular star-shaped polymer with β-CD as a core includes the following steps.

S1: Preparing a β-cyclodextrin-modified branched monomer F-β-CD. Its procedures are detailed same as S1 of Example 1.

S2: Preparing a supramolecular star-shaped polymer with β-CD as a core. Its procedures are detailed as follows.

S21: 9.6 g of acrylamide, 2.5 g of acrylic acid and 0.3 g of surface active macromonomer, allyl polyoxyethylene ether, are put into distilled water, of this solution, the pH is adjusted to about 7 with 10% NaOH solution, then 0.1 g of hydrophobic monomers, N-phenylethyl-N-tetradecylmethacrylamide, and 0.25 g of surfactants, sodium dodecyl sulfate, are put into the solution, the resultant solution are stirred until it is clear and transparent, next β-cyclodextrin modified branched monomer F-β-CD (the total mass fraction of monomer is 0.3%0) is put into the resultant solution, and a certain amount of distilled water is poured to enable the total concentration of monomer to be 25%, finally the solution is aerated with nitrogen for more than 15 min to remove the dissolved oxygen in the solution to give a de-oxygenated system.

S22: A photoinitiator, v50 (the total mass fraction of monomer is 0.2%) is put to the de-oxygenated system to give a solution, which is placed under a photoinitiation device to react for 4 h at 1030° C. to give a white colloid, that is, a supramolecular star-shaped polymer with β-CD as a core.

Example 3

A method for preparing the forementioned supramolecular star-shaped polymer with β-CD as a core includes the following steps.

S1: Preparing a β-cyclodextrin-modified branched monomer F-β-CD. Its procedures are detailed same as S1 of Example 1.

S2: Preparing a supramolecular star-shaped polymer with β-CD as a core. Its procedures are detailed as follows.

S21: 9.6 g of acrylamide, 2.5 g of acrylic acid and 0.2 g of surface active macromonomer, polyoxyethylene cetyl methacrylate, are put into distilled water, of this solution, the pH is adjusted to about 7 with 10% NaOH solution, then 0.1 g of hydrophobic monomers, N-benzyl-N-tetradecylmethacrylamide, and 0.4 g of surfactants, sodium dodecyl sulfate, are put into the solution, the resultant solution are stirred until it is clear and transparent, next β-cyclodextrin modified branched monomer F-β-CD (the total mass fraction of monomer is 0.5%0) is put into the resultant solution, and a certain amount of distilled water is poured to enable the total concentration of monomer to be 25%, finally the solution is aerated with nitrogen for more than 15 min to remove the dissolved oxygen in the solution to give a de-oxygenated system.

S22: A photoinitiator, v50 (the total mass fraction of monomer is 0.2%) is put to the de-oxygenated system to give a solution, which is placed under a photoinitiation device to react for 4 h at 1030° C. to give a white colloid, that is, a supramolecular star-shaped polymer with β-CD as a core.

Performance Analysis of a Supramolecular Star-Shaped Polymer with β-CD as a Core (1) Structural Characterization of the Supramolecular Star-Shaped Polymer with β-CD as a Core.

Figure 1:
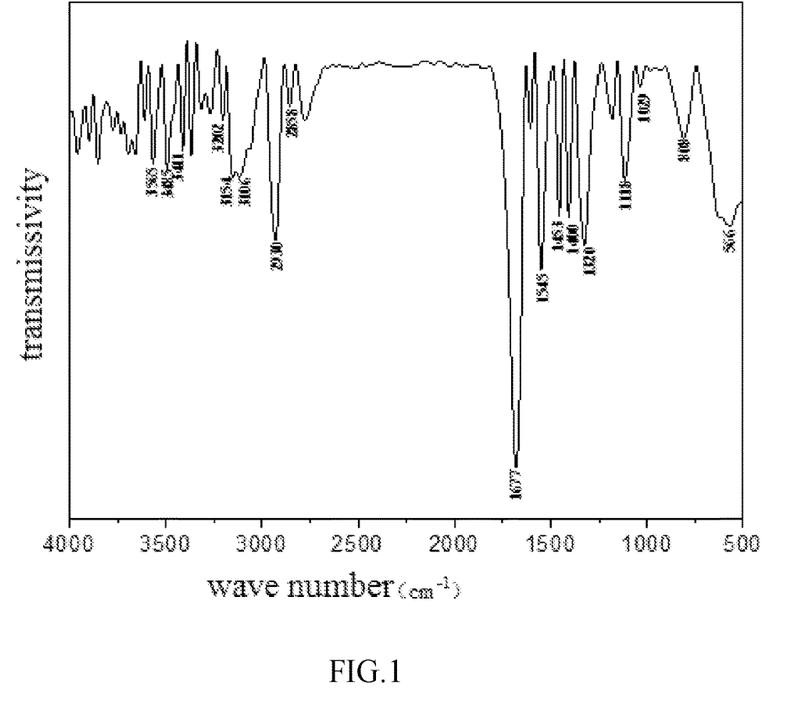
FIG. 1 is an infrared spectrum in the synthetization of the supramolecular star-shaped polymer with β-CD as a core in Example 1.

FIG. 1 is an infrared spectrum in the synthetization of the supramolecular star-shaped polymer with β-CD as a core in Example 1. It can be seen from the graph that 3565 $cm^{-1}$ and 3458 $cm^{-1}$ represent an absorption peak of the stretching vibration of the O—H bonds in a cyclodextrin structure, 3411 $cm^{-1}$ and 3202 $cm^{-1}$ represent an absorption peak of the stretching vibration of the N—H bonds in an amide structure, 3154 $cm^{-1}$ and 3106 $cm^{-1}$ represent an absorption peak of the stretching vibration of the C—H bonds in a benzene ring structure, 2930 $cm^{-1}$ and 2858 $cm^{-1}$ represent an absorption peak of the stretching vibration of the C—H bonds in a methylene structure, 1677 $cm^{-1}$ represents an absorption peak of the stretching vibration of the C═O bonds in an amide group structure, 1545 $cm^{-1}$ represents an absorption peak of the stretching vibration of the C═O bonds in a carboxyl group, 1453 $cm^{-1}$ represents scissor bending vibration of methyl and methylene, 1400 $cm^{-1}$ represents an absorption peak of the stretching vibration of the C—N bonds in an amide group structure, 1320 $cm^{-1}$ represents bending vibration of N—H bonds in an amide structure, 1118 $cm^{-1}$ represents an absorption peak of the stretching vibration of the C—O—C bonds in a polyoxyethylene ether structure, 1029 $cm^{-1}$ represents an absorption peak of the stretching vibration of the C—O bonds in a cyclodextrin hydroxyl group, and 808 $cm^{-1}$ and 566 $cm^{-1}$ represent skeletal vibration of cyclodextrin. An infrared analysis shows that the target product contains the characteristic groups such as β-cyclodextrin, polyoxyethylene ether and benzene rings, indicating that the β-cyclodextrin modified functional monomer F-β-CD, the hydrophobic monomer, N-benzyl-ndodecyl methyl acrylamide, and the surface active macromolecular monomer, lauryl alcohol polyoxyethylene ether methacrylate, have been involved in the polyreaction to prepare the supramolecular star-shaped polymer with β-CD as a core.

(2) Tackifying Performance of the Supramolecular Star-Shaped Polymer with β-CD as a Core.

Figure 2:
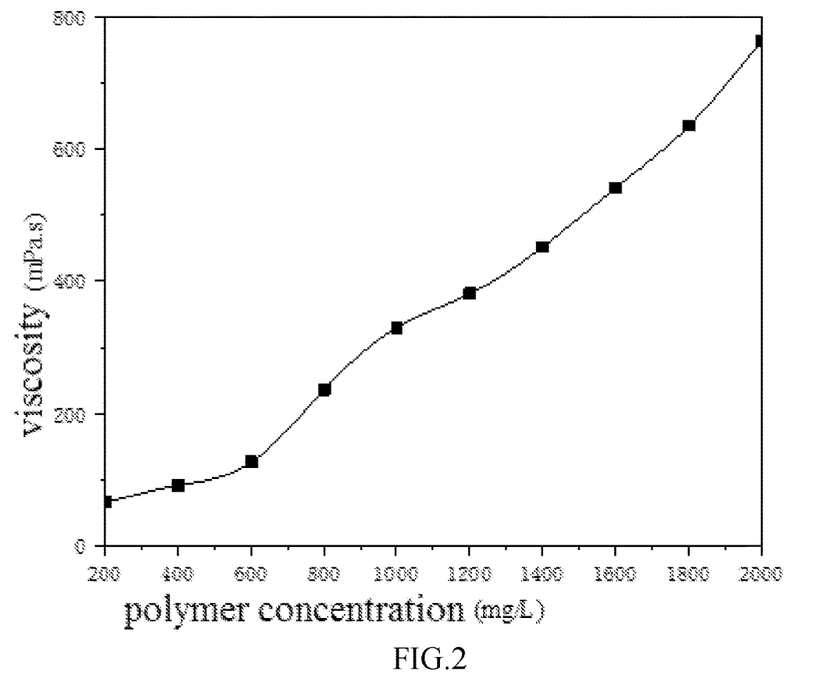
FIG. 2 is a viscosity-concentration curve in the synthetization of the supramolecular star-shaped polymer with β-CD as a core in Example 1.

The supramolecular star-shaped polymer with β-CD as a core synthesized in Example 1 is compounded into polymer solutions with different concentrations. The viscosity-concentration curve of the polymer has been measured at room temperature and a shear rate of 7.34 $s^{-1}$, and the resultant picture is shown in FIG. 2. It can be seen from FIG. 2 that the polymer has strong hydrophobic association and good tackifying performance, and the viscosity of the polymer solution reaches 329.7 mPa·s at 1000 mg/L and 763.8 mPa·s at 2000 mg/L.

(3) Temperature Resistance of the Supramolecular Star-Shaped Polymer with β-CD as a Core.

The supramolecular star-shaped polymer with β-CD as a core synthesized in Example 1 is compounded into a solution of 1000 mg/L. The viscosity-temperature curve of the polymer has been measured at a shear rate of 7.34 $s^{-1}$, and the resultant picture is shown in FIG. 3.

Figure 3:
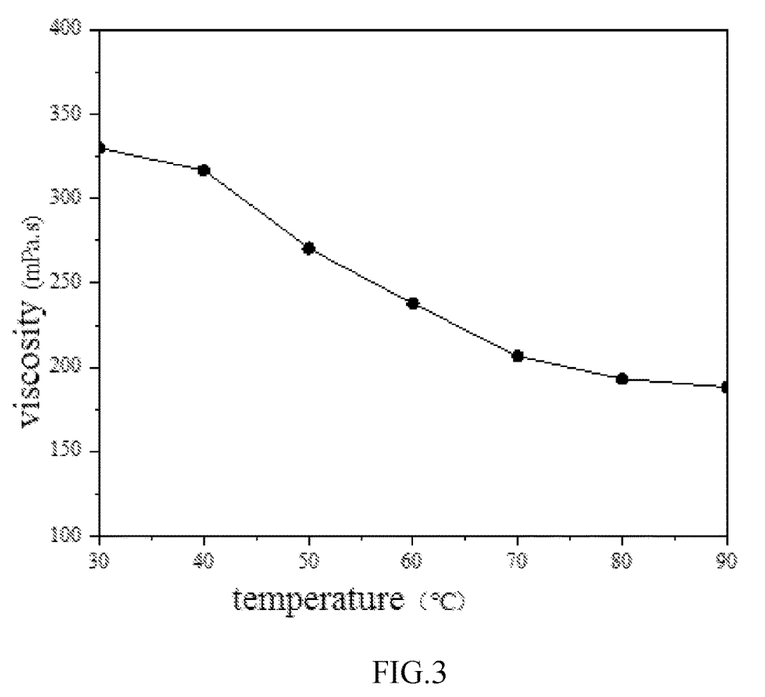
FIG. 3 is a viscosity-temperature curve in the synthetization of the supramolecular star-shaped polymer with β-CD as a core in Example 1.

It can be seen from FIG. 3 that the viscosity is 188.2 mPa-s at 90° C. and the viscosity retention rate is 57%, indicating that the supramolecular star-shaped polymer with β-CD as a core still has good temperature resistance even at a fairly small dosage.

(4) Salt Resistance of the Supramolecular Star-Shaped Polymer with β-CD as a Core.

Salt sensitivity study is performed on the supramolecular star-shaped polymer with β-CD as a core synthesized in Example 1, then the prepared polymer is compounded into a solution of 1000 mg/L at different salinity. The apparent viscosity changes of the polymer with its NaCl concentration changes have been measured at room temperature and a shear rate of 7.34 $s^{-1}$, and the resultant picture is shown in FIG. 4.

Figure 4:
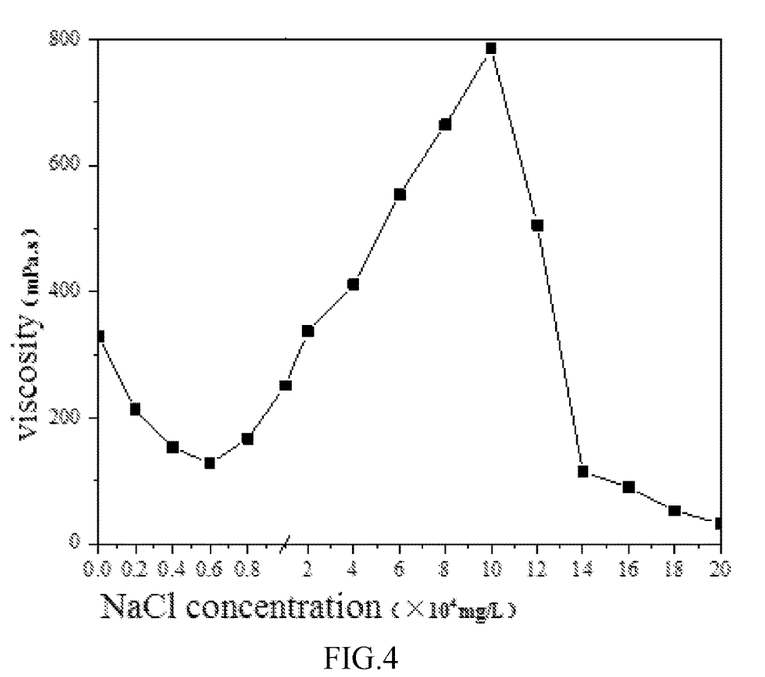
FIG. 4 is a viscosity-NaCl concentration curve in the synthetization of the supramolecular star-shaped polymer with β-CD as a core in Example 1.

It can be seen from FIG. 4 that for the supramolecular star-shaped polymer with β-CD as a core, its sensitivity to NaCl can be divided into three stages. The viscosity of the polymer solution decreases with increase of salinity in a low salinity range as well as in a high salinity range; the viscosity of the polymer solution increases with increase of salinity in a moderately-high salinity range, showing a significant salt-thickening effect and a wide range of salt-thickening effects; the viscosity of the polymer solution reaches a maximum value of approximately 2.4 times the initial viscosity at a NaCl concentration of $10 \times 10^4$ mg/L.

(5) Viscoelasticity of the Supramolecular Star-Shaped Polymer with β-CD as a Core.

Figure 5:
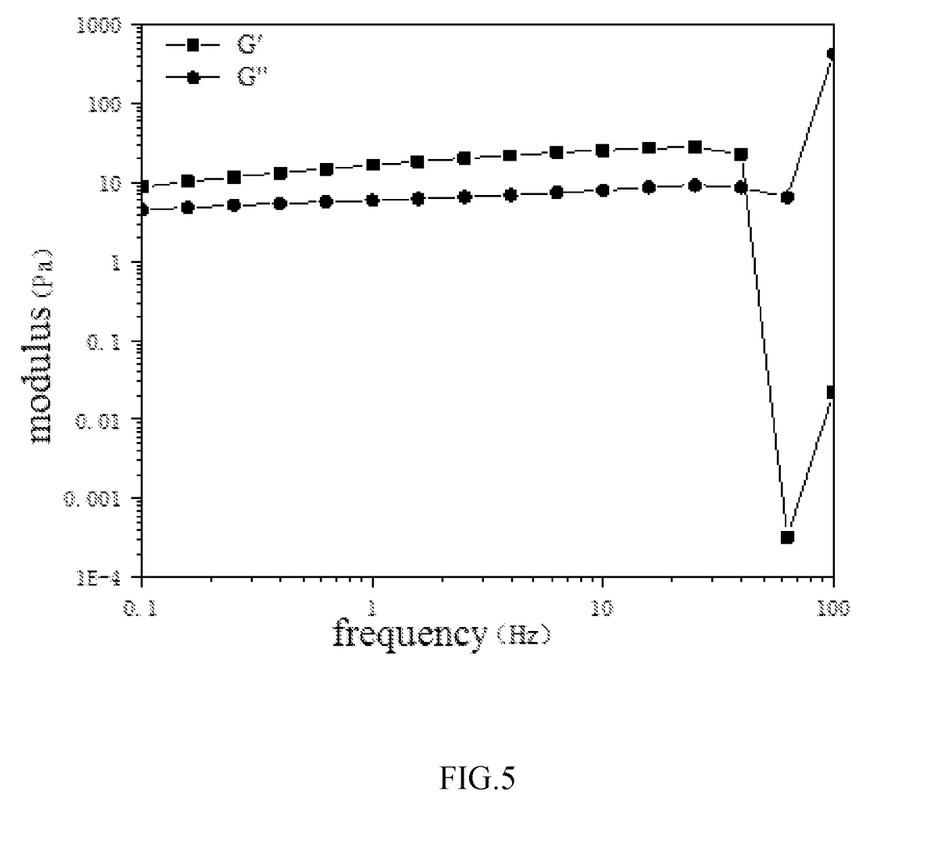
FIG. 5 shows viscoelasticity in the synthetization of the supramolecular star-shaped polymer with β-CD as a core in Example 1.

The supramolecular star-shaped polymer with β-CD as a core synthesized in Example 1 is compounded into a solution of 6000 mg/L for viscoelasticity study, and the resultant picture is shown in FIG. 5.

It can be seen from FIG. 5 that in the linear viscoelastic range, the storage modulus (G') is always greater than the loss modulus (G"), indicating that the supramolecular star-shaped polymer with β-CD as a core has a distinct elastic behavior and viscoelastic fluids dominated by elasticity; at a frequency of 1 Hz, G' and G" are 16.8 Pa and 6.0 Pa, respectively, much higher than the standards of G'≥1.5 Pa and G"≥0.3 Pa for the water-base fracturing fluid, and G'≥2.0 Pa and G"≥0.3 Pa for the viscoelastic surfactant. Therefore, the supramolecular star-shaped polymer with β-CD as a core has excellent viscoelasticity.

What is claimed is:

1. A supramolecular star-shaped polymer with β-CD as a core, having a β-cyclodextrin-modified branched monomer F-β-CD that serves as a core and is grafted with acrylamide, acrylic acid, hydrophobic monomers and surface-active macromolecular monomers to form the supramolecular star-shaped polymer;

wherein said β-cyclodextrin-modified branched monomer F-β-CD has the following structure:

in said supramolecular star-shaped polymer with β-CD as a core, its branch chain has the following structural formula:

where, x, y, m and n are a percentage of a structural unit, x is 70-85%, y is 10-25%, m is 0.05-0.2%, n=1-x-y-m; A is the hydrophobic monomer, which is one or more of N-benzyl-N alkyl (meth) acrylamide and N-phenethyl-N alkyl (meth) acrylamide; B is the surface-active macromolecular monomer, which is one or more of allyl polyoxyethylene ether, alkyl phenol polyoxyethylene ether (methyl) acrylate, alkyl phenol polyoxyethylene ether allyl ether, alkyl alcohol polyoxyethylene ether (meth)acrylate and alkyl alcohol polyoxyethylene ether allyl ether; said supramolecular star-shaped polymer with β-CD as a core has a viscosity-average molecular weight of 1 to 8 million.

2. A method for preparing said supramolecular star-shaped polymer with β-CD as a core according to claim 1, comprising the following steps in sequence:

S1: preparing a β-cyclodextrin-modified branched monomer F-β-CD, provided in its procedures as follows:

S11: making β-cyclodextrin react with p-toluenesulfonyl chloride by means of anhydrous pyridine as a solvent to prepare all-6-position sulfonylated β-cyclodextrin Ts-β-CD;

S12: making the all-6-position sulfonated β-cyclodextrin react with ethylenediamine by means of methanol as a solvent to prepare all-6-position ethylenediamine-substituted β-cyclodextrin EDA-β-CD having high reactivity; and S13: making the all-6-position ethylenediamine substituted β-cyclodextrin react with maleic anhydride by means of dimethyl sulfoxide as a solvent to give the target product, β-cyclodextrin-modified branched monomer F-β-CD; and S2: preparing a supramolecular star-shaped polymer with β-CD as a core, provided in its procedures as follows:

S21: adding acrylamide, acrylic acid and surface active macromolecular monomers to distilled water to give a solution, adjusting the solution's pH to about 7 with 10% NaOH solution; then adding hydrophobic monomers and a surfactant, sodium dodecyl sulfate into the solution to give a resultant solution, and stirring the resultant solution until it becomes clear and transparent; next adding the β-cyclodextrin modified branched monomer F-β-CD into the resultant solution to give a still resultant solution, finally aerating the still resultant solution with nitrogen for more than 15 min to give a de-oxygenated system; and S22: adding a photoinitiator to the de-oxygenated system to give a solution, then placing the solution to react under a photoinitiation device for 3~5 h at a reaction temperature of 10~30° C., so as to obtain a white colloid, that is, the supramolecular star-shaped polymer with β-CD as a core.

3. The preparation method according to claim 2, wherein the photoinitiator is azodiisobutyramidine hydrochloride.

4. The preparation method according to claim 2, wherein in S21, the total mass fraction of monomers in the reaction system is 20~25%, of which 15~20% is the acrylamide's mass fraction, 2~5% is the acrylic acid's mass fraction, 0.1~0.3% is the hydrophobic monomer's mass fraction, 0.2~0.6% is the surface active macromolecular monomer's mass fraction, 0.4~0.8% is the sodium dodecyl sulfate's mass fraction, and the mass of the β-cyclodextrin modified branched monomer F-β-CD is 0.3~0.5% of the total mass of monomers.

* * * * *